H. V. TEETER.
TIRE CARRIER.
APPLICATION FILED SEPT. 22, 1919.
1,381,366.
Patented June 14, 1921.
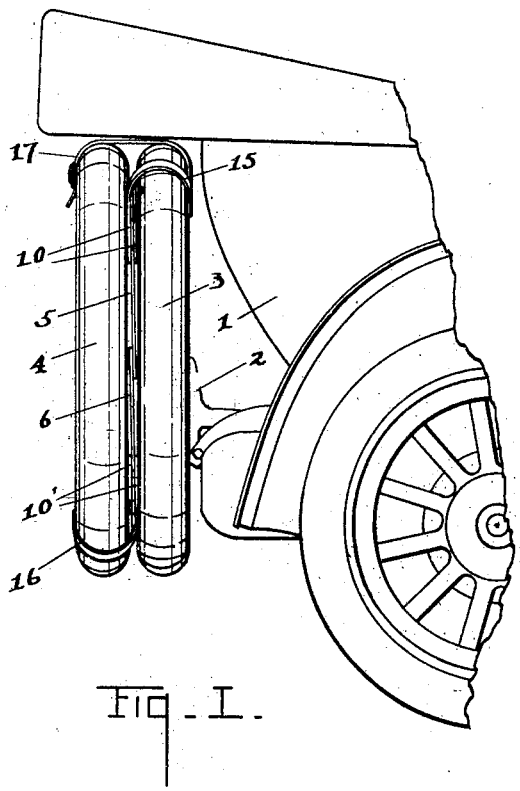
Fig. I.
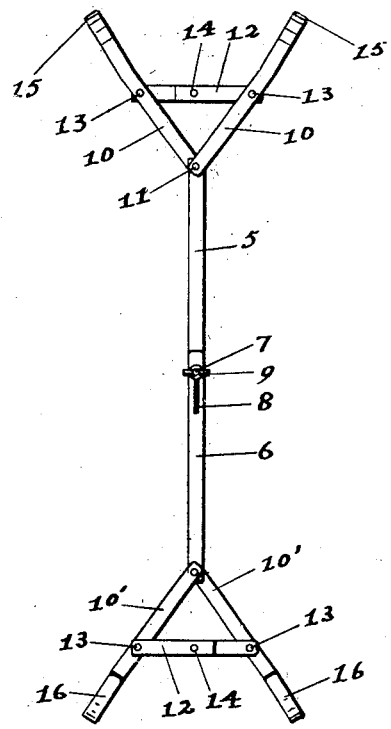
Fig. II.
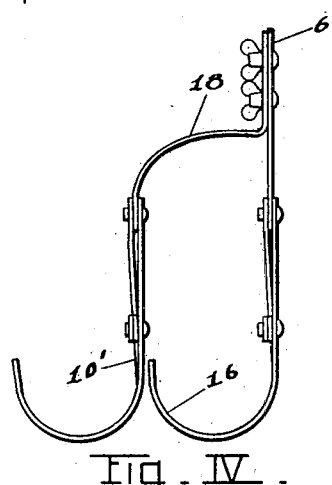
Fig. IV.
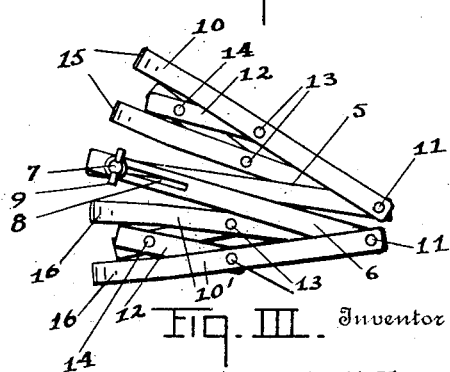
Fig. III.
Inventor
Harold V. Teeter
By Chappell & Earl
Attorneys
Witnesses
M. Louise Thurston
Lenn Gilman

UNITED STATES PATENT OFFICE.

HAROLD V. TEETER, OF KALAMAZOO, MICHIGAN.

TIRE-CARRIER.

1,381,366.   Specification of Letters Patent.   Patented June 14, 1921.

Application filed September 22, 1919. Serial No. 325,463.

*To all whom it may concern:*

Be it known that I, HAROLD V. TEETER, a citizen of the United States, residing at the city and county of Kalamazoo, State of Michigan, have invented certain new and useful Improvements in Tire-Carriers, of which the following is a specification.

This invention relates to improvements in tire carriers.

The main objects of this invention are:

First, to provide an improved tire carrier which is adapted to be used as an attachment in carrying a second spare tire in addition to the spare tire mounted on the carrier with which automobiles are now quite commonly provided.

Second, to provide a tire carrier which may be collapsed into compact form when not in use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side elevation of the rear portion of a vehicle equipped with one of my improved tire carriers.

Fig. II is a rear view of my improved tire carrier.

Fig. III is a side view of my improved tire carrier when collapsed.

Fig. IV is a detail side view of a modified form of my invention.

In the drawing, similar reference characters refer to similar parts throughout the several views.

Referring to the drawing, 1 represents the body of a motor vehicle and 2 a tire carrier permanently mounted at the rear thereof. A tire 3 is shown as mounted on the carrier 2. The second tire 4 is supported by my improved tire carrier or holder which comprises a hanger bar formed of sections 5 and 6, section 5 carrying a bolt 7 engaging a slot 8 in the section 6. The bolt 7 is provided with a winged clamping nut 9. By adjusting the bolt 7 in the slot 8, the length of the hanger bar may be adjusted to suit the particular tire.

At its upper end, the hanger bar is provided with a pair of arms 10 mounted on the pivot 11 and connected by the stretcher or brace 12. One section of this brace is connected to each arm 10 at 13, the sections of the stretcher being connected by pivot 14. Similar arms 10' are provided at the lower end of the hanger bar. The lower arms 10' are also connected by a jointed stretcher as described so that they may be collapsed and folded at the side of the collapsed longitudinal bar as shown in Fig. III. The upper arms 10 are provided with hooks 15 adapted to be engaged over the tire 3. The tire 4 is arranged in the hooks 16 of the lower arms and these arms are provided with outwardly facing hooks adapted to receive the tire as 4. The upper end of the tire is supported by the strap 17.

In the modification shown in Fig. IV the arm 18 is mounted on the lower section of the bar 6 to overhang the hooks 16. The section 6 terminates in a pair of arms 10' thus providing for an additional tire.

My improved tire carrier may be collapsed quite compactly as shown in Fig. III for convenience in carrying. It is quickly and easily set up for use as shown in Fig. II, and as stated may be engaged over a tire mounted on a permanent carrier and will receive and effectively support a second tire as in Fig. I.

The arms 18 are made removable so that when not desired they may be detached and, further, they may be removed to provide greater compactness when the structure is collapsed. Instead of collapsing, as shown in Fig. III, the sections 5 and 6 may be disconnected by removing the winged nut 9 which will permit the sections with their collapsed arms being arranged in reversed relation, making a somewhat more compact bundle and one of more uniform dimensions, or the sections with their arms may be separately stored, as convenient.

I have not attempted to illustrate and describe certain other modifications which might be desirable to completely adapt my invention to certain use as I believe the disclosure made will enable those skilled in the art to which my invention relates to embody or adapt the same as may be desired.

Having thus described my invention, what I claim as new and desire to secure by Letters Patent is:

1. In a tire carrier, the combination of a hanger bar comprising adjustably and foldably connected sections permitting the adjustment of the bar to vary its length or the collapsing of the sections side by side, and pairs of arms pivotally mounted on the ends of said bar the arms of each pair being connected by collapsible stretchers so that they may be supported in extended position or collapsed side by side against the said bar sections, said pairs of arms terminating in oppositely facing hooks, the hooks of one pair of arms being engageable over a tire supporting the other pair to receive a tire.

2. In a tire carrier, the combination of a hanger bar, and pairs of arms pivotally mounted on the ends of said bar the arms of each pair being connected by collapsible stretchers so that the may be supported in extended position or collapsed, said pairs of arms terminating in oppositely facing hooks, the hooks of one pair of arms being engageable over a tire supporting the other pair to receive a tire.

3. In a tire carrier, the combination of a hanger bar, and pairs of arms pivotally mounted on said bar the arms of each pair being connected by collapsible stretchers so that they may be supported in an extended relation or collapsed side by side, said pairs of arms terminating in pairs of oppositely facing hooks, the hooks of one pair of arms being engageable over a tire and the other constituting rests for another tire.

In witness whereof, I have hereunto set my hand and seal in the presence of two witnesses.

HAROLD V. TEETER. [L. S.]

Witnesses:
LUELLA G. GREENFIELD,
GRACE B. THOMPSON.